United States Patent [19]
Lowe et al.

[11] Patent Number: 5,394,485
[45] Date of Patent: Feb. 28, 1995

[54] METHOD AND APPARATUS FOR SMOOTHED SCALING OF FACSIMILE IMAGES

[75] Inventors: David J. Lowe; Trudy L. Benjamin, both of Vancouver; William S. Eaton, Ridgefield, all of Wash.

[73] Assignee: Hewlett-Packard Company, Palo Alto, Calif.

[21] Appl. No.: 32,222

[22] Filed: Mar. 17, 1993

[51] Int. Cl.6 ............................ G06K 9/42; G06K 9/40
[52] U.S. Cl. ......................................... 382/47; 382/54; 395/128
[58] Field of Search ............................ 382/47, 54, 41; 395/128, 102, 139; 358/525, 528, 428, 451; 345/130; 348/358, 581

[56] References Cited

U.S. PATENT DOCUMENTS

| | | | |
|---|---|---|---|
| 3,921,164 | 11/1975 | Anderson | 395/138 |
| 4,569,081 | 2/1986 | Mintzer et al. | 382/47 |
| 4,791,491 | 12/1988 | Minora | 358/284 |
| 4,979,229 | 12/1990 | Moolenaar | 382/56 |
| 5,029,108 | 7/1991 | Lung | 364/519 |
| 5,134,495 | 7/1992 | Frazier et al. | 358/298 |
| 5,140,648 | 8/1992 | Hackett et al. | 382/47 |
| 5,149,212 | 9/1992 | Murakami | 400/121 |
| 5,155,503 | 10/1992 | Tasaki et al. | 346/140 R |
| 5,282,057 | 1/1994 | Maillax et al. | 358/445 |

FOREIGN PATENT DOCUMENTS

58-183450 12/1983 Japan .

*Primary Examiner*—David K. Moore
*Assistant Examiner*—Michael R. Cammarata

[57] ABSTRACT

Facsimile image-scaling and -smoothing method and apparatus are described. They scale a received facsimile image along a given axis to increase the printed image resolution therealong, while smoothing the scaled image to reduce visually objectionable ticks. They do so by analyzing received image data with respect to adjacent received lines having disparate pixel counts and by filling in pixels therebetween in accordance with predefined fill rules that are designed also to smooth the output image to be printed. Various predefined rules are applied to produce intermediate results some or all of which are comprehended by the scaling/smoothing algorithm to produce the final smoothed, scaled output pixel image. Preferably such analyzing and filling in accordance with such rules are performed by a hybrid hardware and firmware subsystem within a receiving facsimile machine or facsimile-receiving printer.

10 Claims, 5 Drawing Sheets

METHOD AND APPARATUS FOR SMOOTHED SCALING OF FACSIMILE IMAGES

TECHNICAL FIELD

The present invention relates generally to the scaling of facsimile images. More particularly, it concerns the smoothed vertical-resolution multiplication of received facsimile images to reduce the objectional visibility of transmitted image artifacts and to achieve higher print quality.

BACKGROUND ART

Facsimile images typically are of one of two vertical resolution standards, e.g. 98 lines per inch or 196 lines per inch. In facsimile reception-capable printers and certain more recent facsimile equipment, 300 dots per inch (DPI) vertical resolution is more common. Thus, there is a need to have higher resolution facsimile imaging equipment vertically expand, or scale, the received facsimile image as by filling in between vertically adjacent received dots with print dots to render the printed facsimile image vertically full scale and contiguous, i.e. spatially continuous. When facsimile images are produced, there frequently is a potentially visible pixel or dot artifact called a 'tick', which will be understood to refer to an extraneous black dot in the transmitted image that is added by the imaging equipment above or below horizontal lines within the scanned image. There is a need to reduce the objectionable visibility of such ticks in printed facsimile output images.

DISCLOSURE OF THE INVENTION

The invented method and apparatus scale a received facsimile image along a given axis to increase the printed image resolution therealong, while smoothing the scaled image to reduce visually objectionable ticks. They do so by analyzing received image data with respect to adjacent received lines having disparate pixel counts and by filling in pixels therebetween in accordance with predefined fill rules that are designed also to smooth the output image to be printed. Various predefined rules are applied to produce intermediate results which are comprehended by the scaling/smoothing algorithm to produce the final smoothed, scaled output pixel image. Preferably such analyzing and filling in accordance with such rules are performed by a hybrid hardware and firmware subsystem within a receiving facsimile machine or facsimile-receiving printer.

These and additional objects and advantages of the present invention will be more readily understood after a consideration of the drawings and the detailed description of the preferred embodiment.

DETAILED DESCRIPTION OF THE PREFERRED EMBODIMENTS AND BEST MODE OF CARRYING OUT THE INVENTION

Figure 1A:
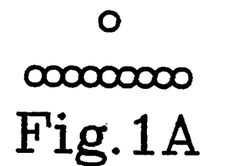
FIGS. 1A and 1B illustrate a first input facsimile image and a corresponding, smoothed, resolution-multiplied intermediate image produced in accordance with one aspect of the preferred method and apparatus.
Figure 1B:
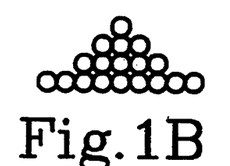

Referring first briefly to FIGS. 1A and 1B, FIG. 1A represents a typical lower resolution received pixel image consisting of two vertically adjacent pixel rows having a disparate number of on pixels (represented by circles). FIG. 1B represents a corresponding higher resolution intermediate pixel image having two spacing pixel rows added between the two original pixel rows. In accordance with the invented method and apparatus, such resolution-multiplied output pixel images not only are of higher resolution, but also are smoothed by the choice of pixel images within the added spacing rows. Preferably, as may be seen from FIG. 1B, such added pixel images are of on-pixel lengths, or have on-pixel counts, that are intermediate, and preferably graduated, between the counts of the narrower upper pixel row and the wider lower pixel row of the received pixel image. It will be understood that FIG. 1B illustrates only an intermediate result of the invented method and apparatus, and not an end result.

Figure 2A:
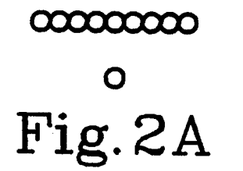
FIGS. 2A and 2B illustrate a second input facsimile image and a corresponding intermediate image produced by another aspect of the preferred method and apparatus.
Figure 2B:
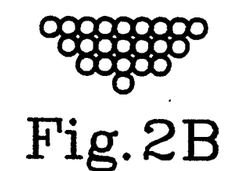

Considering next FIGS. 2A and 2B, it may be seen that another typical input pixel image is shown in FIG. 2A, with a corresponding intermediate output pixel image, shown in FIG. 2B that similarly is smoothed and resolution multiplied. Contrasting FIGS. 1B and 2B reveals that the processing steps that produce them in accordance with the rules described herein are not exactly complementary, yet both yield intermediate results that are resolution multiplied and smoothed between adjacent pixel rows of the received pixel image that have disparate on-pixel counts, e.g. one in the upper or lower row and nine in the other row. Again, it will be understood that FIG. 2B represents an intermediate result, and not an end result of the invented resolution multiplying and smoothing method and apparatus.

Figure 3A:
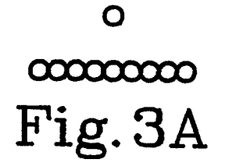
FIGS. 3A and 3B illustrate the first input facsimile image and a corresponding intermediate image produced by yet another aspect of the invention.
Figure 3B:
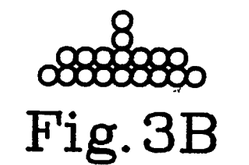

Referring briefly now to FIGS. 3A and 3B, yet another intermediate result of received pixel image processing is illustrated whereby the identical received pixel image of FIG. 1A is processed differently, in accordance with the rules described herein, to produce a slightly differently smoothed, yet resolution-multiplied intermediate pixel image. As noted above, FIG. 3B represents only an intermediate and not an end result of the invented method and apparatus.

Figure 4A:
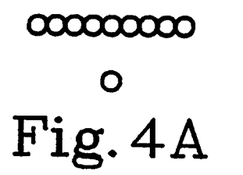
FIGS. 4A and 4B illustrate the second input facsimile image and a corresponding intermediate image produced by still another aspect of the invention.
Figure 4B:
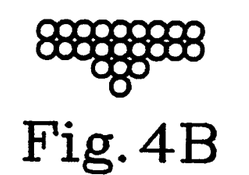

FIGS. 4A and 4B illustrate still another intermediate result of received pixel image processing similar to that shown in FIGS. 2A and 2B, wherein the lower one of adjacent received pixel rows has a single on pixel and wherein the upper one thereof has nine on pixels. Once again, a slightly differently smoothed, resolution-multiplied intermediate pixel image is produced, as may be confirmed by comparing FIGS. 2A and 2B with FIGS. 4A and 4B.

Figure 5:
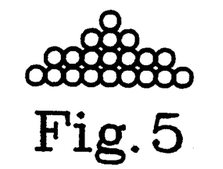
FIG. 5 illustrates the smoothed, resolution-multiplied output image that results from application of the invented process on the first input facsimile image.

Turning now to FIG. 5, it will be appreciated that there is represented an output, to-be-printed pixel image having a desirably smoothed and resolution-multiplied correspondence with the input pixel images of FIGS. 1A and 3A. It will be understood that the output pixel image of FIG. 5 represents a pixel row-by-pixel row logical combination of on pixels of the corresponding intermediate pixel images of FIGS. 1B and 3B. Specifically, in accordance with the invented method and apparatus, the first and last rows of the output pixel images of FIG. 5 are merely a replication of the upper and lower input pixel image rows. In other words, in accordance with the invented method and apparatus, the resolution-multiplying and smoothing steps do not affect these output pixel rows.

In accordance with the invented method and apparatus, the added spacing, or filler, lines (the number of which in this illustrated example is two) are formulated in accordance with predefined rules that ensure desirable smoothing of the resolution-multiplied pixel image between the adjacent rows of the received pixel image. Specifically, the first added spacing row (the upper one of the two spacing rows) is determined by operation 1 illustrated in FIGS. 1A and 1B. In contrast, the second added spacing row (the lower one of the two spacing rows) is determined by combining operation 1 illustrated in FIGS. 1A and 1B and operation 3 illustrated in FIGS. 3A and 3B. In accordance with the invention, such combination is a bit-wise logical OR of the on pixels in FIGS. 1B and 3B, as may be seen.

Figure 6:
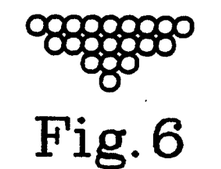
FIG. 6 illustrates the smoothed, resolution-multiplied output image that results from application of the invented process on the second input facsimile image.

Referring to FIG. 6, the result of applying the invented smoothing, resolution-multiplying method and apparatus to the received pixel image shown in FIGS. 2A and 4A may be seen. FIG. 6 represents a combined application of operations 2, 3 and 4 corresponding, respectively, with FIGS. 2A and 2B, 3A and 3B and 4A and 4B. It may be seen that, as before, the top and bottom received pixel rows simply are replicated in the output, while the upper spacing, or filler, row is same as the corresponding row of the intermediate pixel image in FIG. 2B and the lower spacing row is the same as the corresponding row of the intermediate pixel image in FIG. 4B. Those skilled in the art will appreciate that operations 1, 2, 3 and 4 illustrated in FIGS. 1A, 1B, 2A, 2B, 3A, 3B, 4A and 4B may be thought of as smoothing primitives that usefully are combined, in accordance with invention, to produce smoothed, resolution-multiplied, printable output pixel images.

For purposes of the equations listed below and the boolean calculations or combinations involved in their solution, it will be appreciated that LS and NS values represent "smeared" values, and LR and NR values represent "rounded" values. It also will be appreciated that the logical AND operator is designated by $\cap$ and that the logical OR operator is designated by $\cup$ in the boolean combinations. The equations implemented by the preferred method and apparatus are as follows:

$$LS: \text{For } i=0 \text{ to } 7, LS[i]=(L[i+7] \cup L[i+8]) \cap L[i+9]) \cap N[i+8] \tag{1}$$

$$NS: \text{For } i=0 \text{ to } 7,$$
$$NS[i]=(N[i+7] \cup N[i+8] \cup N[i+9]) \cap L[i+8] \tag{2}$$

$$LR: \text{For } i=0 \text{ to } 7, LR[i]=L[i+7] \cap L[i+8] \cap L[i+9] \tag{3}$$

$$NR: \text{For } i=0 \text{ to } 7,$$
$$NR[i]=N[i+7] \cap N[i+8] \cap N[i+9] \tag{4}$$

$$LSorNS = LS \cup NS \tag{5}$$

$$LSorLR = LS \cup LR \tag{6}$$

$$LSorNR = LS \cup NR \tag{7}$$

$$NSorLR = NS \cup LR \tag{8}$$

$$NSorNR = NS \cup NR \tag{9}$$

$$LRorNR = LR \cup NR \tag{10}$$

$$LSorNSorLR = LS \cup NS \cup LR \tag{11}$$

$$LSorNSorNR = LS \cup NS \cup NR \tag{12}$$

$$LSorLRorNR = LS \cup LR \cup NR \tag{13}$$

$$NSorLRorNR = NS \cup LR \cup NR \tag{14; and}$$

$$LSorNSorLRorNR = LS \cup NS \cup LR \cup NR \tag{15}.$$

Those skilled in the art will appreciate that, while all of the above equations are implemented in accordance with the preferred embodiment of the invention, only equations (6) and (12) are used by the invented solution to produce the desired facsimile image fill and smooth attributes. Specifically, LSorNSorNR defines the last fill row and LSorLR defines all but the last fill row, as will be better illustrated by example. All equations are implemented in hardware for the sake of firmware flexibility in devising alternative invented solutions for various applications or image resolution-multiplying and -smoothing criteria.

In accordance with the preferred embodiment of the invention, equations (1) through (15) are implemented in hardware illustrated in FIGS. 7A through 7D. Those skilled in the art will appreciate that the illustrated hardware registers and gating logic readily may be incorporated into existing facsimile receiving or printer equipment, as by sharing an input/output (I/O) bus with read-and-write memory (RAM), read-only memory (ROM), central processing unit (CPU) and print control logic that form part of a graphics processor module (GPM). Such conventional GPM typically communicates with host processor logic including, for example, COmpress/DECompress (CODEC) logic, RAM, ROM, CPU and a modem-connected line control unit (LCU). It will be appreciated that compressed image data received over a telephone line and stored in RAM within the host processor may be decompressed by the CODEC and sent to the GPM, where it is stored uncompressed in RAM for processing by the invented apparatus prior to printing of smoothed, high-resolution facsimile images.

The hardware of the invented apparatus preferably includes two 17-bit shift registers L (last) and N (next), only the eight LSBs of which may be written under firmware control and combinational logic circuits shown schematically in FIGS. 7A through 7F. Such combinational logic preferably includes an array of AND and OR gates defining what may be thought of logically as four 8-bit "registers" or bytes, LS, NS, LR, NR (which it will be appreciated need not be implemented as physical registers); and an array of two-, three- and four-input OR gates, the outputs of which may be read under firmware control. While the illustrated LS, NS, LR, NR bytes, or bit-wise organizations of the logic combinations of selected bits of the L and N hardware registers, within the spirit of the invention, may be implemented as hardware registers, or storage elements, those skilled in the art will appreciate that the outputs of the AND and OR gates shown in FIGS. 7A through 7D more simply may be input directly to the OR gates shown in FIGS. 7E and 7F, without buffering or drive circuitry therebetween.

The least-significant byte of the L register successively is written under control of the firmware with the most recently input (e.g. received) or processed (whether passed unchanged or added) pixel row, and the least-significant byte of the N register successively is written under control of the firmware with the next input (e.g. received) and to-be-processed pixel row. Stated another way, the L register always contains either a received byte of last input pixel row data or the last-created byte of added pixel row data, whereas the N register always contains a next received byte of adjacent input pixel row data. In effect, the combinational logic rounds and smears the output pixel image, not as between adjacent input pixel rows, but instead as between adjacent output pixel rows.

Combinational logic connected with bits 7 through 16 of the L and N registers produces last and next rounded and smeared outputs represented as four eight-bit "registers" LS, NS, LR, NR that correspond with equations (1) through (4) above (and also with operations 1 through 4, described above), as illustrated in FIGS. 7A through 7D. Those of skill will appreciate that, although they are illustrated in quadruplicate in FIGS. 7A through 7D, registers L, N are actually singular, i.e. each merely represents a singular, seventeen-bit register, the selected output bits of which are combined as shown in four different ways to produce the desired LS, NS, LR, NR logic combinations, or bytes.

Not shown in FIGS. 7A through 7D are the array of OR gates that generate LSorNS, LSorLR, LSorNR, NSorLR, NSorNR, LRorNR, LSorNSorLR, LSorN-SorNR, LSorLRorNR, NSorLRorNR, LSorSNorL-RorNR, the inputs of which are corresponding bits of the outputs of ones of the LS, NS, LR, NR logic combinations that implement equations (5) through (15). The outputs of these OR gates will be understood by skilled persons to define the bit-wise logical OR combinations of two or more of the LS, NS, LR, NR bytes shown in FIGS. 7A through 7D. As is pointed out above, by the invented method, only the LSorLR and LSorNSorNR OR gate outputs are actually read by the firmware and written to an array of output, or fill pattern, pixel rows.

Figure 7A:
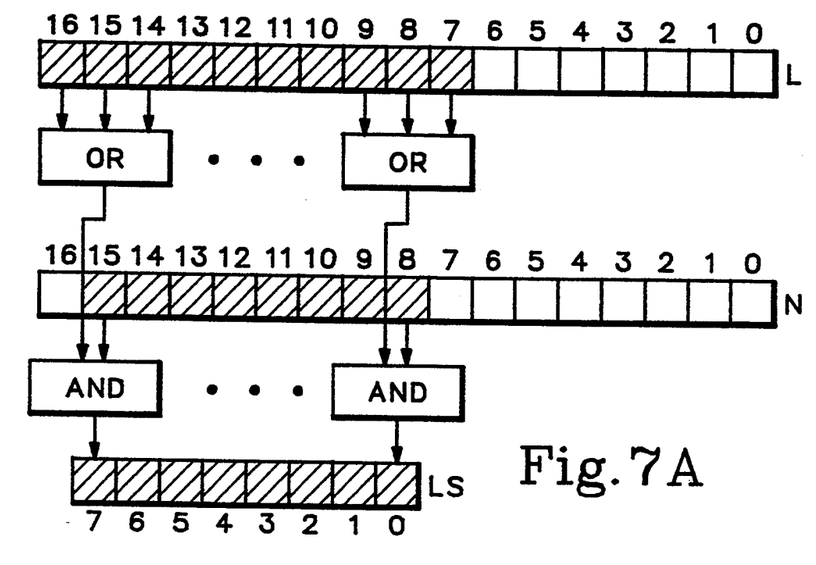
FIGS. 7A, 7B, 7C, 7D, 7E, and 7F are a functional block diagrams illustrating the preferred hardware register layout and gating logic, in accordance with the preferred hardware-assisted implementation of the preferred method and apparatus.
Figure 7B:
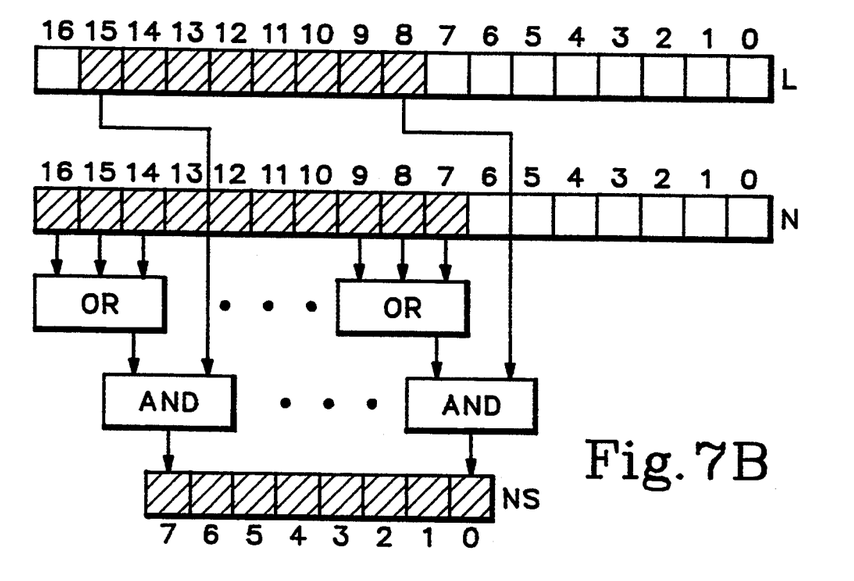
Figure 7C:
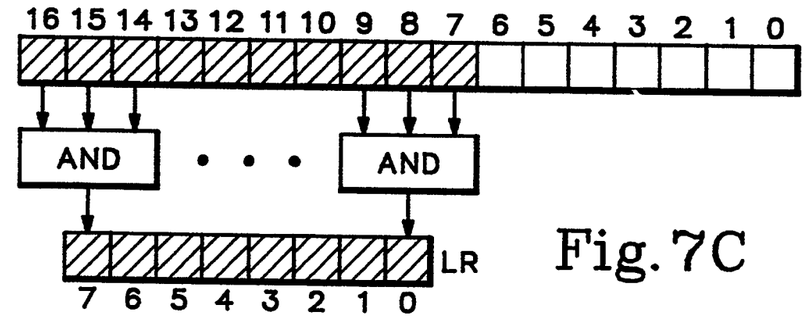
Figure 7D:
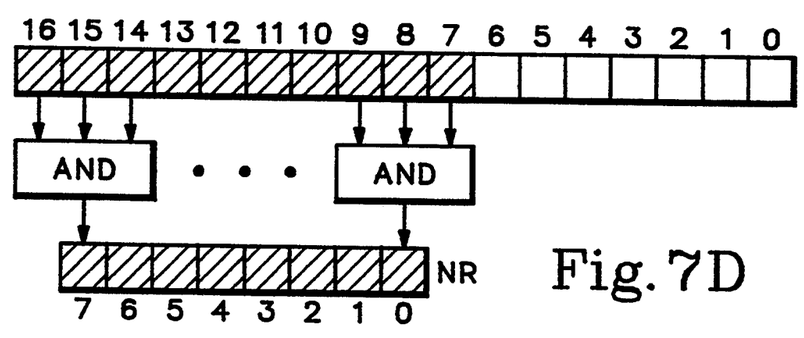
Figure 7E:
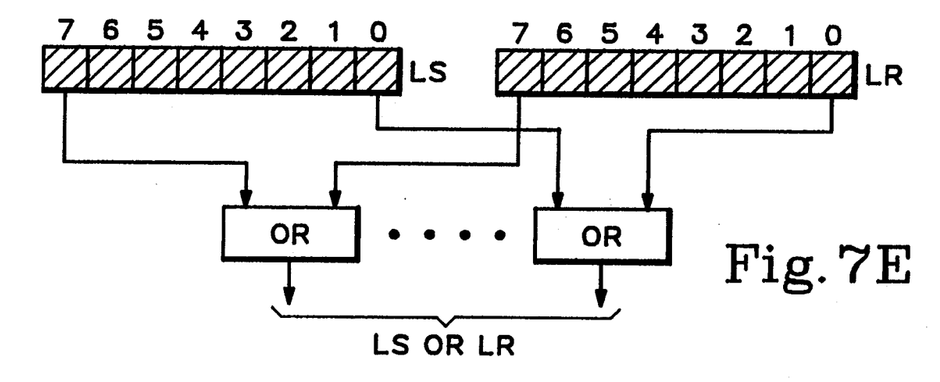
Figure 7F:
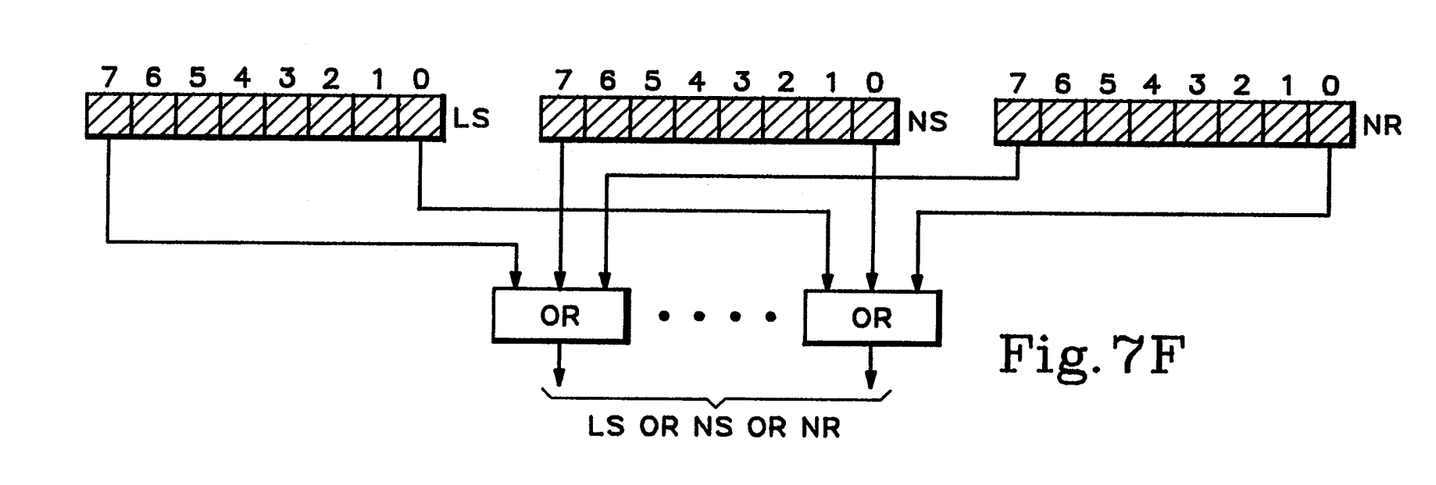

These two bit-wise logic combinations are shown in FIGS. 7E and 7F, where it will be understood that LS, NS, LR and NR are the same bytes shown in FIGS. 7A through 7D and that there actually are eight OR gates (only two of which are shown)that produce the eight-bit output LSorLR (designated "LS OR LR" in FIG. 7E) and that there are actually eight OR gates (only two of which are shown) that produce the eight-bit output LSorNSorNR (designated "LS OR NS OR NR" in FIG. 7F). In alternative hardware and firmware implementations, within the spirit of the invention, these and/or other logic combinations of LS, NS, LR and NR also may be implemented, as all are available for ORing by hardware and for reading by firmware. Thus, more or fewer logic combinations may be provided, with an attendant increase or decrease in the flexibility with which the firmware may be implemented to perform a desired facsimile image-smoothing function in accordance with the invention. It also will be appreciated that the invention alternatively may be implemented in software or firmware executing within the CPU or a dedicated microprocessor.

Figure 8A:
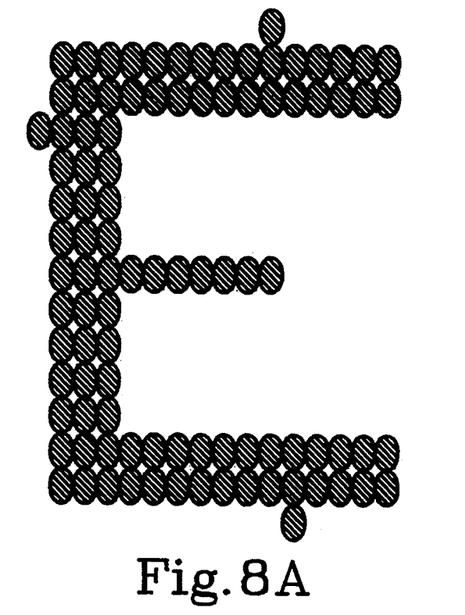
FIGS. 8A, 8B, 8C, and 8D illustrate typical input and smoothed, resolution-multiplied output pixel images processed in accordance with the invention.
Figure 8B:
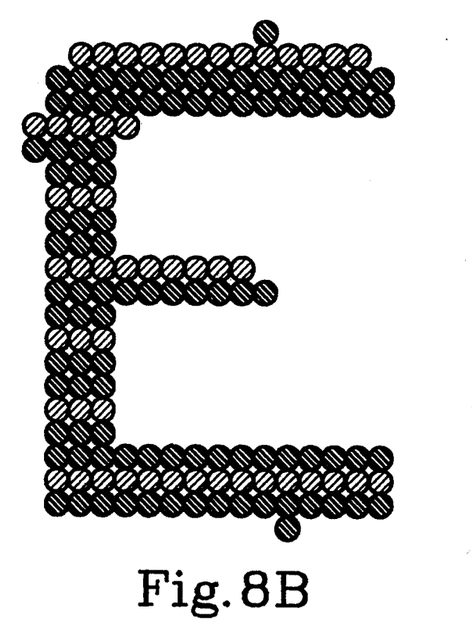
Figure 8C:
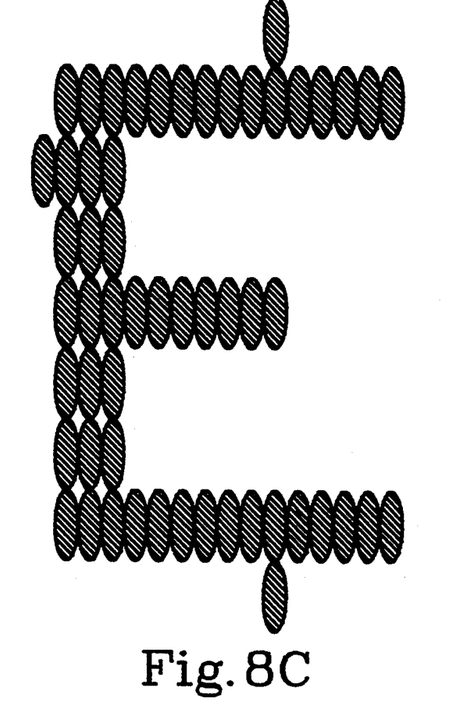
Figure 8D:
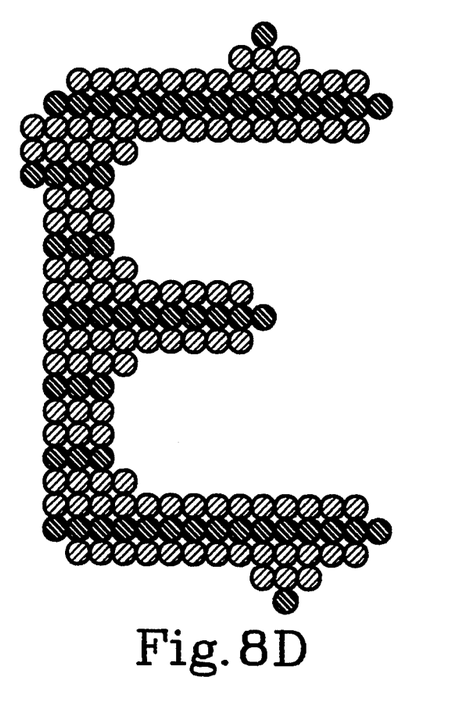

Briefly summarizing the scaling method used in conjunction with the invented method and apparatus, reference is made to FIGS. 8A, 8B, 8C and 8D. FIGS. 8A and 8B illustrate (at grossly exaggerated scale), respectively, the vertical scaling or resolution multiplying of a 196 line per inch input pixel image of the letter "E" into a 300 DPI output pixel image, with smoothing in accordance with the invented method and apparatus. FIGS. 8C and 8D illustrate, respectively, the vertical scaling or resolution multiplying of a 98 lines per inch input pixel image of the letter "E" into a 300 DPI output pixel image, also with smoothing in accordance with the invented method and apparatus.

Those who are skilled will appreciate that, at the typically small scale and high resolution at which a facsimile image such as the illustratively represented (and grossly enlarged) letter "E" would be printed-e.g. in ten or twelve point type and at 300 DPI-the invented scaling and smoothing substantially enhances the visual appearance of the output facsimile image, regardless of the resolution and accuracy of the received facsimile image. While only textual facsimile images are illustrated herein as being subject to the invented scaling and smoothing, those of skill will appreciate that the resolution-multiplying and smoothing method and apparatus described and illustrated herein lends itself as well to enhanced graphic facsimile image processing, as the invention simply processes adjacent rows of received pixel data in accordance with predefined smearing and rounding rules without regard for the larger picture, i.e. without concern with overall facsimile image content.

FIGS. 8A and 8C illustrate lower resolution received pixel images received, for example, by a facsimile machine, wherein extraneous pixels, or ticks, visibly and objectionably appear at the top, bottom and left side of the letter "E." FIGS. 8B and 8D illustrate higher resolution printable output pixel images corresponding, respectively, to FIGS. 8A and 8C that are produced by the invented method and apparatus. FIGS. 8B and 8D may be seen to replicate pixel rows of their corresponding received pixel images with higher resolution pixel rows of identical length, and in addition vertically to expand the number of higher resolution pixel rows by vertically spacing such replicate rows and adding therebetween one or more so-called "spacing" rows of pixels in accordance with the, rules described above. The result, as may be seen is that there is beneficial rounding of corners that otherwise would be apparent in the output pixel image.

Unless the resolution of the to-be-printed image is an integral multiple of that of the received image, it is not possible to place spacing pixel rows in the output image at exactly corresponding vertical locations. For example, the fifth row of pixels (shaded) from the top of the "E" in FIG. 8D should have placed one and one-half lines down from the fourth row of pixels (black) to center it between the fourth and seventh rows (black) that correspond to the upper leg of the "E" of the original pixel image in FIG. 8C. The limits of the high-resolution grid on which output pixels may be placed require that the spacing line be placed one or two lines below the fourth row. Thus, scaling in accordance with the invented method and apparatus is achieved by varying the number of spacing lines that are added between original pixel rows, in accordance with the ratio between the low-resolution received pixel image and the high-resolution printed output pixel image.

Those of skill in the art will appreciate that it is preferred to select a nominal number of lines that would create an output pixel image line spacing that is as close as possible to, but never more than, the original spacing. Then extra spacing lines are added occasionally to correct for accumulated placement errors over a page of facsimile image printed output. At typically high print resolutions such as 300 DPI, such controlledly limited placement errors are imperceptible. Preferably, received pixel images are processed from top to bottom. Each received, or original, pixel row is replicated in the output pixel image in a location that is spaced from the previous original pixel row in the output by at least the nominal number of spacing lines. As each such spacing line is placed, any line placement error is added to a variable cumulative placement error maintained in memory. If the cumulative error is greater than the line placement resolution, an extra line of spacing is added between the current and previous line. Then the amount of the line placement resolution is subtracted from the cumulative error prior to proceeding to the next original pixel row. Nominal line spacing may be calculated by dividing the higher resolution by the lower resolution using integer division, with any remainder being the line placement error. Such ratiometric output pixel image line spacing is readily accomplished by those skilled in the art.

It may be seen by contrasting FIGS. 8A and 8B that there also is stone rounding of corners of the original received pixel image that are not artifacts but that instead represent defined features of the original pixel image. For example, the upper left and right corners of the upper horizontal leg of the E and the upper right corner of the center horizontal leg thereof are rounded by the invented method and apparatus. Similar rounding occurs by the smoothed scaling or resolution-multiplying process that produces the output pixel image illustrated in FIG. 8D from that illustrated in FIG. 8C. These are an effect of the invented method and apparatus that represents a desirable compromise in producing smoothed, high resolution facsimile image printed output.

The invented facsimile image-processing apparatus now may be understood to include 1) input facsimile image data structure having a defined resolution along a given axis (e.g. the vertical axis as shown in FIGS. 8A and 8C), with the structure including a first and a second row each having plural pixels each having a defined on/off state, the first and second rows being adjacent (also as shown in FIGS. 8A and 8C); and 2) a processor for processing the input data structure (e.g. the processor described herein as including the hardware registers and combinational logic shown in FIGS. 7A through 7F and a microprocessor executing the described firmware operations). Preferably, the processor includes a first plural-pixel storage element (e.g. the L register) storing a defined number of plural pixels of said first pixel row and a second plural-pixel storage element (e.g. the N register) storing a defined number of plural pixels of the second pixel row.

In accordance with the preferred embodiment of the invention, the processor also includes combinational logic (e.g. the OR and AND gates illustrated in FIGS. 7A through 7D) producing plural predefined first logic combinations of selected ones of the stored pixels from the first and second storage elements, with the first logic combinations defining plural-pixel intermediate data structures (e.g. LR, LS, NR, NS) representing a predefined number of plural pixels corresponding to the outputs of the first logic combinations (e.g. those shown in FIGS. 7A through 7D). Also in keeping with the preferred embodiment, the invented processor defines a plural-pixel output data structure (e.g. LSorLR and LSorNSorNR illustrated in FIGS. 7E and 7F) based upon predefined second logic combinations (e.g. the OR gates also illustrated in FIGS. 7E and 7F) of selected ones of such intermediate data structures.

As may be seen from FIGS. 8A and 8B, the processor effectively performs input pixel image rounding and smearing as between selected pixels of the first and second pixel rows (e.g. the darkly shaded pixel rows of FIGS. 8A and 8C). Further, it may be seen from FIGS. 7C and 7D that the first logic combinations preferably include one or more bit-wise AND functions to perform such image rounding (as represented by bytes LR, NR) and it may be seen from FIGS. 7A and 7B that the second logic combinations preferably include one or more bit-wise OR functions to perform such image smearing (as represented by bytes LS, NS).

As described and illustrated herein, the first and second logic combinations preferably are performed in hardware, due to pixel processing rate requirements, although of course one or both, within the spirit of the invention, may be performed instead in firmware. Preferably, the processor includes firmware for reading the plural-pixel output data structure (e.g. LSorLR and LSorNSorNR of FIGS. 7E and 7F), as described above. As illustrated in FIGS. 8B and 8D, the processor may be seen to produce a third row of plural pixels (the lightly shaded pixels of FIGS. 8B and 8D) each having a determined on/off state, with the determined on/off state of at least one of the plural pixels in the third row being based upon such processing of the input data structure, with the third row of plural pixels being output, e.g. for printing by a facsimile printer, by the processor spatially between and along with (i.e. in addition to) the first and second rows of plural pixels of the input facsimile image data structure. In this way, the resolution of such facsimile image along the given axis, e.g. a vertical axis, effectively is increased by a desired ratio, as described above and as illustrated in FIGS. 8A through 8D.

An invented method of scaling lower resolution received image data for printing on a higher resolution output device also now may be understood, based upon an understanding of the invented apparatus described above. The preferred method may be characterized as including the following steps: 1) identifying received image data containing, along a given print axis (such as the vertical axis represented in FIGS. 8A and 8C), disparate pixel counts of adjacent received pixel rows (e.g. the first row of each of the letters "E" containing a singular on pixel representing a tick and the second row thereof containing one or more horizontal rows of on pixels representing the top leg of the letter "E"), and in connection with such identified data; 2) selectively turning on off pixels in one or more added output pixel rows located between received pixel rows of the received image data (e.g. those pixel rows of FIGS. 8B and 8D that are lightly shaded) to produce modified output image data for printing, wherein the average number of on pixels in the added output pixel rows is intermediate the number of pixels in such received pixel rows and is graduated in a predetermined manner between such disparate pixel counts (e.g. the thirteen-pixel second row of FIG. 8B being intermediate in count between the single-pixel top row and the fifteen-pixel second row of FIG. 8A; the three-pixel second row of FIG. 8D being intermediate in count between the single-pixel top row and the fifteen-pixel second row of FIG. 8C; the thirteen-pixel third row of FIG. 8D also being intermediate in count between the single-pixel top row and the fifteen-pixel second row of FIG. 8C; the count of on pixels in the added row(s) graduating predeterminedly from one to thirteen to fifteen in FIG. 8B and from one to three to thirteen to fifteen in FIG. 8D).

The invention alternatively may be understood to be a facsimile image resolution-multiplying method that includes the following steps: 1) receiving a facsimile image of a first pixel resolution along a given axis (e.g. the vertical axis shown in FIGS. 8A and 8C); 2) expanding such received image along such given axis to multiply the first pixel resolution, with the expanding being performed by spacing apart selected ones of adjacent rows of such received image a predefined amount (e.g. by spacing apart each pair of input pixel rows, as illustrated in FIGS. 8C and 8D); and 3) filling such expanded image between said spaced-apart adjacent rows by selectively adding rows of on pixels based upon predetermined fill criteria (e.g. by adding the lightly shaded pixel rows of FIG. 8D). Preferably, the filling step includes smoothing in accordance with predetermined smooth criteria that produce a smooth filled pixel region between spaced-apart adjacent rows represented by on pixel row counts within the filled pixel region that are graduated between the counts of the spaced-apart adjacent rows (e.g. the three- and thirteen-pixel counts of second and third rows of FIG. 8D effectively smoothing the single-pixel tick in the top row of FIG. 8C into the fifteen-pixel second row thereof, as illustrated).

INDUSTRIAL APPLICABILITY

It may be seen then that the method and apparatus of the invention are compatible with higher resolution receiving facsimile or related printer equipment, and produce output or printed images that are of increased resolution along a given axis but without objectionable ticks and sharp corners and other features that would be apparent if no smoothing were had. The resolution-multiplying, or image-scaling, rules straightforwardly and inexpensively may be implemented in software, firmware, hardware or a combination thereof within a receiving facsimile machine or dot printer. The result is significant, but relatively inexpensive, on-the-fly improvement in printed facsimile images.

While the present invention has been shown and described with reference to the foregoing operational principles and preferred embodiment, it will be apparent to those skilled in the art that other changes in form and detail may be made therein without departing from the spirit and scope of the invention as defined in the appended claims.

We claim:

1. A method of scaling lower resolution received image data for printing on a higher resolution output device, comprising:
   receiving image data containing, along a given print axis, disparate on-pixel counts of adjacent received pixel rows
   adding one or more output pixel rows between received pixel rows of the received image data; and
   in connection with such received image data, selectively turning on pixels in the added output pixel rows to produce modified output image data for printing, wherein the on-pixel count of each of said added output pixel rows is intermediate the on-pixel counts of such received pixel rows and is graduated in a predetermined manner between such disparate on-pixel counts.

2. A facsimile image resolution-multiplying method comprising:
   receiving a facsimile image of a first pixel resolution along a given axis;
   expanding such received image along such given axis to multiply the first pixel resolution, said expanding being performed by spacing apart selected ones of adjacent rows of such received image a predefined amount; and
   filling such expanded image between such spaced-apart adjacent rows by selectively adding rows of on pixels based upon predetermined fill criteria, said filling including smoothing in accordance with predetermined smooth criteria that produce a smooth filled pixel region between spaced-apart adjacent rows wherein on-pixel counts of rows within said filled pixel region that are graduated between the on-pixel counts of such spaced-apart adjacent rows.

3. Facsimile image-processing apparatus for image processing a received facsimile image data structure having a defined resolution along a given axis, said structure including a first and a second row, each row having plural pixels, each pixel having a defined on/off state, said first and second rows being adjacent comprising:
   a processor for processing said input data structure, said processor including a first plural-pixel storage element storing a defined number of on-pixels of said first pixel row, said processor further including a second plural-pixel storage element storing a defined number of on-pixels of said second pixel row, said processor further including combinational logic producing plural predefined first logic combinations of selected ones of the stored pixels from said first and said second storage elements, said first logic combinations defining plural-pixel intermediate data structures representing a predefined number of on-pixels corresponding to the outputs of said first logic combinations, said processor producing a plural-pixel output data structure with a number of on-pixels based upon predefined second logic combinations of selected ones of said intermediate data structures, said plural-pixel output data structure being configured for insertion between said first and second rows with said plural-pixel output data structure defining a smooth filled pixel region between said first and second rows wherein said smooth filled pixel region is graduated between said first and second rows.

4. The apparatus of claim 3, wherein said processor selects pixels of said first and said second pixel rows and performs input pixel image rounding and smearing between said selected pixels.

5. The apparatus of claim 4, wherein said first logic combinations include one or more bit-wise AND functions to perform said image rounding and one or more bit-wise OR functions to perform said image smearing.

6. The apparatus of claim 5, wherein said first logic combinations are performed in hardware.

7. The apparatus of claim 5, wherein said second logic combinations include one or more bit-wise OR functions performed in hardware.

8. The apparatus of claim 5, wherein said first and said second logic combinations are performed in hardware.

9. The apparatus of claim 8, wherein said processor further includes firmware for reading said plural-pixel output data structure.

10. The apparatus of claim 8, wherein said processor produces a third row of plural pixels each having a determined on/off state, with the determined on/off state of at least one of said plural pixels in said third row being based upon such processing of said input data structure, said third row of plural pixels being output by said processor between and along with said first and said second rows of plural pixels of said input facsimile image data structure, thereby to increase the resolution of such facsimile image along said given axis.

* * * * *